UNITED STATES PATENT OFFICE.

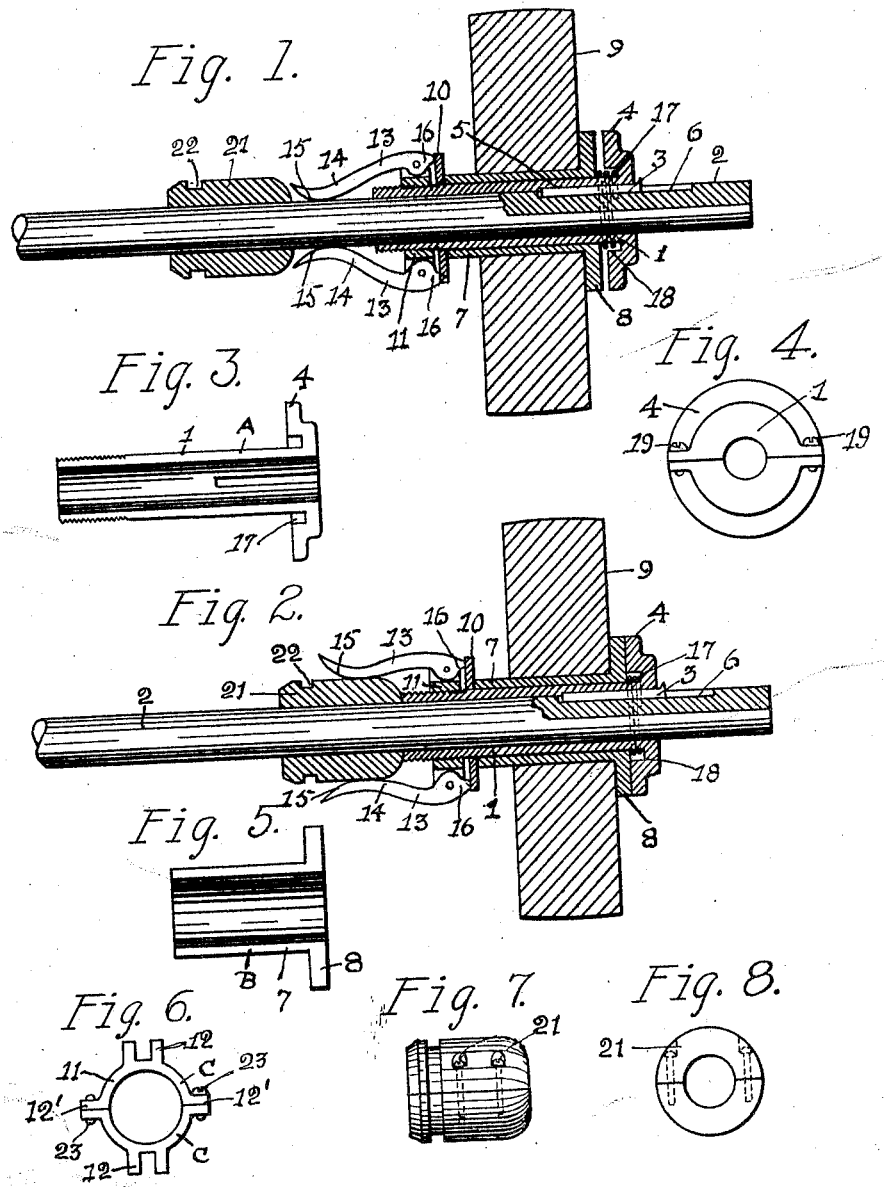

HAWLEY T. BELDEN, OF TOLEDO, OHIO.

FRICTION-CLUTCH FOR LOOSE PULLEYS.

1,037,193.   Specification of Letters Patent.   Patented Sept. 3, 1912.

Application filed April 17, 1911. Serial No. 621,607.

*To all whom it may concern:*

Be it known that I, HAWLEY T. BELDEN, a citizen of the United States, residing at Toledo, in the county of Lucas and State of Ohio, have invented new and useful Improvements in Friction-Clutches for Loose Pulleys, of which the following is a specification.

My invention relates to a friction clutch for loose pulleys and has for its object to provide a device of the kind for mounting a pulley normally loose on a line or countershaft, and whereby the pulley may be frictionally engaged and revolved with the shaft, and disengaged at will. I accomplish these objects by the construction and combination of parts as hereinafter described and illustrated in the drawings, in which—

Figure 1 is a longitudinal diametric section of a clutch device constructed in accordance with my invention, and mounted on a shaft and having a pulley mounted loosely thereon, the parts of the clutch being in position to release the pulley from frictional engagement therewith. Fig. 2 is a similar view showing parts in position frictionally engaging the pulley. Fig. 3 is an inside view of a half section of a split sleeve adapted to be fixedly mounted on the shaft. Fig. 4 is an end view of the sleeve formed by uniting the two half sections. Fig. 5 is an inside view of a half section of a split bearing hub for the pulley. Fig. 6 is an end view of the adjustable clutch collar with the pressure arms removed. Fig. 7 is a side view of a split shift cam collar, and Fig. 8 is an end view of the same.

In the drawings 1 designates a sleeve adapted to be fixedly mounted on a shaft 2 by a key 3 in the usual manner. The sleeve 1 is provided at one end with a disk flange 4 having the inner side faced to form a friction surface, and at the opposite end is threaded for a distance.

The sleeve 1 is preferably, for convenience of mounting it on the shaft 2, formed of half sections A, as shown in Fig. 3 but may be formed of a single piece of metal having a bore to closely receive the shaft.

The sleeve 1 is provided at one side of its bore with a key seat 5 complementary to a key seat 6 in the shaft to receive the key 3, whereby the sleeve is fixedly secured to the shaft, and its periphery is surfaced as a bearing upon which is journaled a hub sleeve 7 of less length than the sleeve 1.

The sleeve 7 is provided at one end with a disk flange 8 having its outer face surfaced for frictional engagement with the inner face of the flange 4 of the sleeve 1. For convenience of assembling the sleeve 7 is also preferably formed of longitudinal half sections B, which after being assembled around the sleeve 1 have tightly assembled around them the half portions of a split pulley 9 with the inner face of the flange 8 closely abutting one side of the pulley.

The body of the hub-sleeve 7 is of greater length than the width of the pulley face, and adjacent to and abutting the end of the sleeve opposite to the flange 8, there is slidably mounted on the sleeve 3 the annular friction disk 10, and on the threaded end portion of the sleeve 1 an interiorly threaded collar 11 is run in to near the disk 10. The collar 11 is provided with diametrically opposite bifurcated lugs 12, in which are fulcrumed near their inner ends the lever arms 13, having long arm portions 14 curved inward toward the shaft 2 and outward at their end portions to form cams 15, and short arm cam portions 16 adapted as the long arms 14 are moved outward to engage the disk 10 and press it against the end of the hub sleeve 7 of the pulley.

The disk flange 4 of the sleeve 1 is provided with an annular groove 17 in which is seated one end of a short helical spring 18 coiled around the sleeve 1 and engaging at its opposite end the flange 8 of the hub sleeve 7. When a split sleeve 1 is used the half sections A are secured together around the shaft by bolts or screws 19 through lugs 20 formed on the disk flange 4 and by the collar 11 run on the threaded end portion of the sleeve. Upon the shaft 2 adjacent to the cam portions 15 of the lever arms 13 is mounted a shift collar 21 having at its outer end portion an annular groove 22 which adapts it for engagement by the yoke of a shift lever (not shown). The opposite end portion of the collar is rounded to adapt it to be wedged between the cam portion 15 of the arms 13, as shown in Fig. 2, by a throw of the collar by the shift lever.

The collar 11 is preferably also formed of half sections C, dividing the collar on a diametric line at 90° from points central between the lugs 12 and dividing lugs 12', which are provided with registering screw orifices whereby the half sections are secured together in threaded engagement around the sleeve by the screws 23 either of which when slightly relaxed permits the adjustment of the collar on the threads of the sleeve 1, and when tightened up, to lock the collar in any position to which it is adjusted.

Thus constructed, when the several parts are assembled on a shaft with the several parts in position as shown in Fig. 1, by movement of the shift collar 21 by the shift lever between the arms 14 of the levers 13, as shown in Fig. 2, the hub sleeve 7 is moved lengthwise and its flange 8 is tightly compressed against the friction face of the flange 4 of the sleeve 3 and thereby frictionally revolves the pulley with the shaft. When the shaft collar 21 is moved from between the levers 13, the pressure is released and the spring 18 separates the friction flanges 4 and 8 and the pulley comes to a rest while the shaft and the sleeve 1 revolve freely in the sleeve 7. It is apparent that the clutch is adapted for use on either a line or counter-shaft.

What I claim to be new is—

1. A friction clutch for loose pulleys, comprising an elongated sleeve adapted to be fixedly mounted on a shaft, said sleeve having a disk flange at one end, a second sleeve of reduced length journaled on the first sleeve, said second sleeve having a disk flange at one end adjacent to and adapted to frictionally engage the disk flange of the first sleeve, a pulley fixedly mounted on the second sleeve as a hub and abutting its flange, an annular friction disk slidably mounted on the first sleeve and means to slide the friction disk and the second sleeve on the first sleeve and frictionally clamp the second sleeve between the disk flange of the first sleeve and the friction disk.

2. In a friction clutch for loose pulleys, the combination with the shaft, an elongated sleeve fixedly mounted on the shaft and provided with a friction flange at one end, a sleeve hub of reduced length journaled on the fixed sleeve, said sleeve hub having a flange at one end adapted to frictionally engage the flange of the fixed sleeve, a pulley fixedly mounted on the sleeve hub, and an annular friction disk slidably mounted on the fixed sleeve and adapted to shoulder against the other end of the sleeve hub, of a collar adapted to be adjustably clamped on the fixed sleeve adjacent to the friction disk, a plurality of levers fulcrumed on the collar, each lever having a short cam arm adapted to wedge between the fulcrum and the friction disk, and a long cam arm, and a shift cam collar slidably mounted on the shaft and adapted to be shifted into and out of wedging engagement with the long arms of the levers, and conjointly operate the short arms to frictionally clamp the sleeve hub between the flange of the fixed sleeve and the friction disk.

In witness whereof I have hereunto set my hand this 13th day of March, 1911.

HAWLEY T. BELDEN.

In presence of—
WM. J. FRITSCHE,
M. S. SMITH.